(No Model.)
B. KERN, Jr.
ROAD CART.
No. 459,495. Patented Sept. 15, 1891.
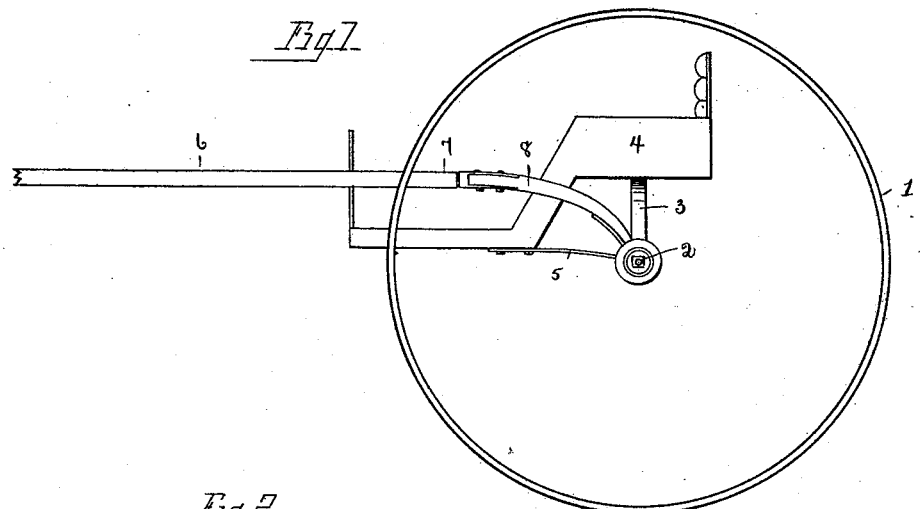
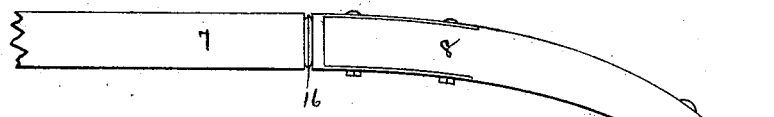
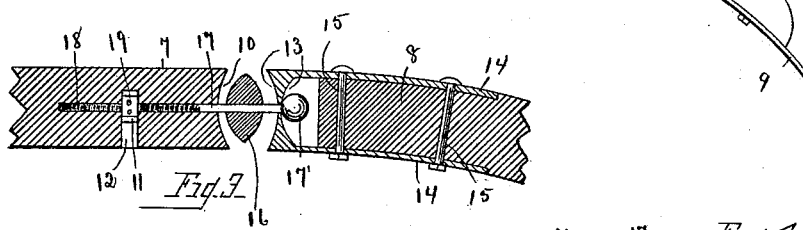
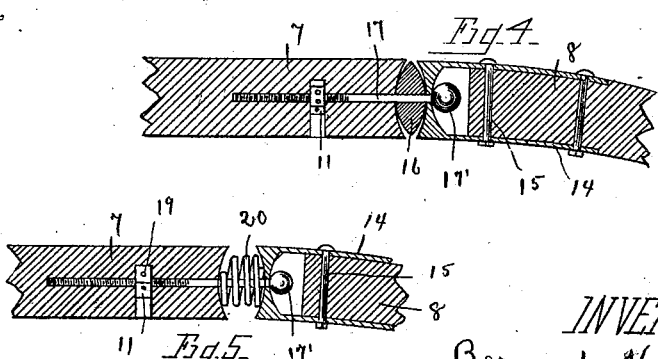
WITNESSES
Carroll J. Webster
G. G. Southard
INVENTOR
Bernard Kern Jr.
By
William Webster
Atty

UNITED STATES PATENT OFFICE.

BERNARD KERN, JR., OF TOLEDO, OHIO, ASSIGNOR OF ONE-HALF TO
FRANK G. M. JACQUET, OF SAME PLACE.

ROAD-CART.

SPECIFICATION forming part of Letters Patent No. 459,495, dated September 15, 1891.

Application filed May 29, 1891. Serial No. 394,480. (No model.)

*To all whom it may concern:*

Be it known that I, BERNARD KERN, Jr., of Toledo, county of Lucas, and State of Ohio, have invented certain new and useful Improvements in Road-Carts; and I do hereby declare that the following is a full, clear, and exact description of the invention, which will enable others skilled in the art to which it appertains to make and use the same, reference being had to the accompanying drawings, and to the figures of reference marked thereon, which form part of this specification.

My invention relates to road-carts, and has for its object to dispense with the horse motion so objectionable in vehicles of this character.

A further object is to simplify and cheapen the construction by which horse motion is avoided.

With these objects in view the invention consists, broadly, in constructing each thill of a plurality of parts, between which are interposed a yielding section and holding the parts assembled by a pivotal connection.

In the drawings I have shown one form of cart to which my yieldingly-constructed thills are adapted; but I wish it understood that my invention is equally well adapted to other forms of carts wherein horse motion is to be avoided.

Figure 1 is a side elevation of a cart provided with my yieldingly-constructed thills. Fig. 2 is a side elevation of a portion of a thill, showing the sections yieldingly assembled. Fig. 3 is a longitudinal vertical section of a portion of a thill, showing the two sections prior to causing tension upon the interposed yielding substance by the pivot-bolt. Fig. 4 is a like view showing the sections assembled. Fig. 5 is a detail view of a modified form of interposed yielding medium.

1 designates the wheels; 2, the axle; 3, the spring; 4, the body, and 5 a brace from the body to the axle. As these parts may be varied to suit the taste of individual owners further description is unnecessary.

6 designates the thills, the thill of each side being formed of two sections, the front portion 7 and the rear portion 8, the latter being provided with a shackle-iron 9 for attachment to the axle. Section 7 is slightly concaved at the end, as at 10, and is provided with a nut 11, set into a recess 12, formed in the section, the object of which will be presently stated. Section 8 is provided with a metal end piece having a double-concave end 13 and straps 14, which extend upon the top and bottom of the sections and are secured by bolts 15, passed through the thill-section and straps.

16 designates a piece of rubber or analogous material interposed between the sections to hold the same yieldingly assembled, and is held in place by means of a bolt 17, passed through the concave end 13 of the end iron of section 8, also through the rubber and into section 7, passing into a hole 18, bored longitudinally of the same, and screwed into nut 11, which is formed with holes 19, into which a punch or spanner may be inserted to turn the same in order to compress the rubber and draw the two sections close together.

In order to allow of a pivotal as well as flexible movement of the sections, I form bolt 17 with a spherical head 17', which, by reason of the concave inner surface of the metal end piece, is allowed a pivotal movement to permit all horse motion communicated to section 7 to cause the same to move sufficiently at the union of the two sections, with the rubber acting as a ball-and-socket joint and the bolt as a pivot to cause the section 8 to be entirely free from the motion communicated to section 7, whereby the axle-box and seat are relieved from the motion communicated to section 7 of the thills.

It will be apparent that I may substitute a spring 20, Fig. 5, for the rubber 16, and thereby secure a flexible joint, without departing from the spirit of my invention; or, if desired, I may form the thills with more than one flexible and pivotal joint along the length of each.

What I claim is—

1. In a road-cart, thills formed of sections having an interposed compressible section and held assembled by means of a bolt extending longitudinally of the section and having a pivotal movement therewith.

2. In a road-cart, thills formed of sections having concave end portions, one of which is of metal, a convexo-convex rubber section interposed between the sections, and a bolt formed with a rounded head passed through 5 the metal end portion and rubber and secured in the opposite section.

In testimony that I claim the foregoing as my own I hereby affix my signature in presence of two witnesses.

BERNARD KERN, Jr.

Witnesses:
WILLIAM WEBSTER,
L. G. WELKER.